METHOD OF PRODUCING A SOLDER-FREE GAS-TIGHT JOINT, AND JOINT PRODUCED THEREBY

Filed Jan. 16, 1967

United States Patent Office 3,502,837

Patented Mar. 24, 1970

3,502,837
METHOD OF PRODUCING A SOLDER-FREE GAS-TIGHT JOINT, AND JOINT PRODUCED THEREBY

Martin Peehs, Erlangen, Germany, assignor to Siemens Aktiengesellschaft, a corporation of Germany Filed Jan. 16, 1967, Ser. No. 609,665
Claims priority, application Germany, Jan. 14, 1966, S 101,451
Int. Cl. B23k *13/00*
U.S. Cl. 219—9.5 1 Claim

ABSTRACT OF THE DISCLOSURE

Method of joining metal and ceramic members which comprises pyrolytically coating the ceramic member with metal by heating the ceramic member in an atmosphere of a vaporous pyrolitically decomposable compound of the metal to a temperature at which the metal precipitates on the ceramic member, displacing the metal-coated ceramic member relative to an induction coil acting as the heat source so as to form eddy currents in the metal coating further heating the ceramic member and further spreading the metal coating thereon. The metal-coated ceramic member is then joined to other metal members by a diffusion-welding process.

Figure 1:
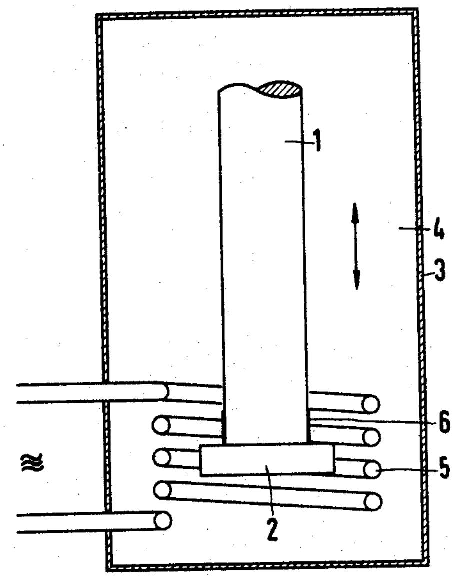

Joint produced by the method between a ceramic fitting is located in an opening formed in a metal wall of a container employed in nuclear reactor and energy conversion technology and a metal flange welded to the wall.

My invention relates to method for producing a solder-free, gas-tight joint, particularly between metal and ceramic members and joint produced thereby.

Joints of this type are of special importance for members which are subjected to high temperature loadings such as, for example electrically insulated bushings located in the walls of containers maintained at high temperatures for permitting entry to the interior of the containers.

The state of the art until now has always found it necessary to insert electrolytically applied metal coatings such as soldering layers between the metal and ceramic members that are to be joined. Such joints have no particularly great mechanical strength and are also not high-temperature resistant because the solder generally has a considerably lower melting point than the members that are to be joined.

It is accordingly an object of my invention to provide method of joining metal and ceramic members which avoids the foregoing disadvantage of the heretofore known methods and which, more particularly, produces a joint of great mechanical strength and high temperature resistance.

With the foregoing and other objects in view, I provide in accordance with my invention, a method of joining metal and ceramic members which comprises initially coating the ceramic structure or member pyrolytically with metal. For this purpose a locality of the structure is heated by heat conduction and radiation from a metal member itself heated by induction currents to the high temperature required for precipitating metal from the vapor phase of a pyrolytically decomposable metal compound. The metal coating thus being formed becomes subjected to eddy currents generated in the coating itself; and the coating is simultaneously subjected to relative motion between the workpiece or ceramic structure being coated and the induction coil so that the eddy currents provide for continued heating of the ceramic member as well as for effecting a further spreading of the metal coating. Subsequently, these metal-coated ceramic members or structures are joined with other metal elements or structures by a diffusion welding technique which does not require the addition of any intermediate metal.

Diffusion welding technology deals with a method of joining which takes place without softening the workpieces or members taking part in the method. The method originates from the mutual indiffusion of the adjacent metal layers superimposed upon one another with great precision; the temperatures employed therein are substantially in the order of magnitude of 1600° C. in the case, for example, of a junction between tungsten and niobium. For efficient functioning of this type of joint it is above all necessary that an adherent and gas-tight metal coating is provided on the ceramic members or structures. This is achieved by pyrolytic deposition or precipitation from the vapor phase of a fugitive and pyrolytically decomposable compound. An example of such a compound is tungsten hexacarbonyl $W(CO)_6$ which decomposes into tungsten and carbon monoxide at workpiece or member temperatures of about 1200° C. The tungsten deposits on the hot surface of the ceramic structure while the carbon monoxide gas is removed by pumping. In carrying out the foregoing it is particularly necessary that the operation be conducted in a closed chamber. With ceramic members or structures, this operation has also encountered great difficulties because it has not been possible until now to heat the ceramic members within the apparatus required to produce the deposition to the high temperature necessary for effecting the deposition.

This has now, however, been rendered possible in accordance with my invention, by inductively heating a metal member or structure placed in engagement with the ceramic member or structure. By heat conduction and radiation, the metal member then in turn heats the adjacent ceramic member or structure to the necessary high temperature so as to form a metal coating on this metal structure and on the ceramic parts heated therewith. If the induction heating coil is then displaced relative to the ceramic member or structure, eddy currents are produced in the metal layers already coating the ceramic structures which causes the metal coatings and the adjoining ceramic structures to be further heated. A continuous deposition of metal on the adjoining ceramic structures thus takes place, and therewith a continuous progressive metal layer is finally formed over the entire ceramic structure.

The features that are considered to be characteristic for the invention are set forth in the appended claim.

Although the invention has been illustrated and described herein as method of producing a solder-free, gas-tight joint, and joint produced thereby, it is nevertheless not intended to be limited to the details shown, since various modifications may be made therein without departing from the spirit of the invention and within the scope and range of equivalents of the claim.

Figure 2:
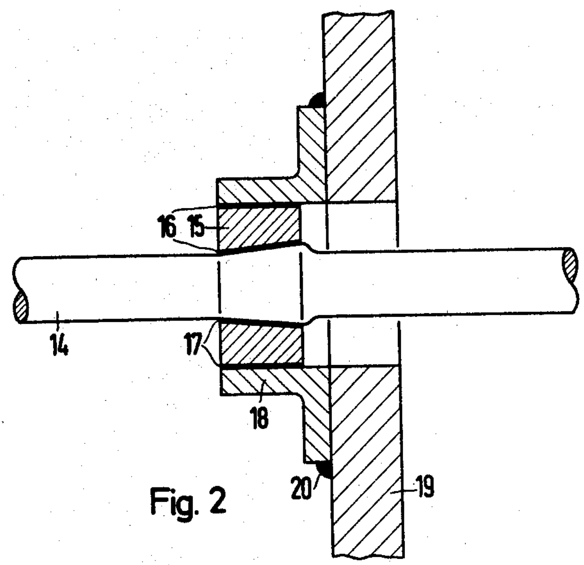

The method of my invention, however, together with additional objects and advantages thereof will be best understood from the following description when read in connection with the accompanying drawing, in which:

FIG. 1 is a schematic view of apparatus employed in carrying out the method of my invention; and FIG. 2 is a schematic view of a joint produced in accordance with the method of the invention.

Referring now to the drawing and first particularly to FIG. 1 thereof, there is shown a chamber 3 filled with with a gas 4 such as, for example, tungsten hexacarbonyl, in which there is located a ceramic rod 1 which is to be coated in accordance with the method of my invention. The ceramic rod 1 is mounted on a metal member 2 which may be held in the chamber by a suitable support which, for the sake of clarity, has been omitted from the drawing. The metal member 2 is surounded by an induction heating coil 5 which is connected as shown diagrammatically with a high frequency generating source. When the high frequency generator is energized, the metal member 2 initially begins to become incandescent and transfers the heat produced therein partly to the closely adjacent ceramic structure 1 so that substantially in the region 6, which is thus heated to a temperature at which the tungsten hexacarbonyl 4 dissociates, tungsten is pyrolytically deposited upon the metal structure 2 and upon the ceramic rod 1. By displacing the induction coil or by moving the ceramic rod 1 and metal member 2 relative to the induction coil, in the direction of the double-headed arrow in FIG. 1, the heating zone or region 6 is passed over the entire ceramic rod so that the ceramic rod is provided with a coating of tungsten on the entire surface thereof when this operation is completed. Naturally, other metals instead of tungsten, such as for example niobium, can be deposited from the gas phase on ceramic members. As soon as a complete coating is provided, it is then possible to further inductively heat the ceramic structure coated with the metal and thereby reinforce or increase the thickness of the metal layer. As an example of the possible thicknesses of the coatings that are obtainable, it is noted that to apply a metal layer of about 10 microns, one hour of being subjected to the aforementioned operation is necessary. It has been determined that this coating is exceptionally adherent to the ceramic member because the metal penetrates into the pores of the ceramic material and is, moreover, completely gas-tight.

It is thereby also possible to join other metal structures or members to ceramic members or structures prepared or pretreated in this manner without using any intermediate solder and by means of diffusion welding technology. For this purpose, the surfaces which are to be joined to one another are accurately machined so that the best possible and most intimate engagement is produced therebetween. By applying high temperatures, which are however below the softening or annealing point of the metals which are to be joined, and high pressures, a diffusion process takes place between the surfaces which are to be joined, affording a tight or impervious and durable as well as wear-resistant junction therebetween. The use of this technique may find application particularly in the case of insulated bushings providing a wall passage through which a rod or tube is inserted through a tank wall subjected to high thermal stress, such as are found for example in nuclear reactor technology and in the technical field of direct energy conversion.

FIG. 2 shows a bushing or fitting in cross section through which a tube may be inserted through a hot wall into a tank. The tank wall 19 is provided with a suitable opening through which the rod 14 extends. An annular ceramic member or structure 15 is shown joined to an annular flange 18 which is in turn secured to the tank wall 19 by welding at 20, the wall passage thus formed being both insulated and sealed. It is also important that the sealed joints 16 and 17 measure up to or are able to withstand the very high temperatures that they may possibly be subjected to.

To produce this junction, the ceramic member, in the form of a ring 15, is initially coated in accordance with the aforedescribed method with tungsten, for example, and thereafter the parallel flat end surfaces of the ring 15 are freed from the metal coating by grinding. Thus, only the annular coatings 16 and 17 remain for the diffusion junction with the annular flange 18 and the rod 14. The annular flange 18 is accordingly shrink-fitted on the ceramic ring 15. The rod 14 has an enlarged tapered portion at the location of the wall passage which is able to be forced into the correspondingly slightly conical bore of the ceramic ring 15 in the intimate contact necessary for the diffusion joining process. After the annular flange 18 has been press fitted on the ring 15 and after the rod 14 has been forced into the mating conical bore of the ring 15, the diffusion welding process then takes place at a temperature suitable for the material of the flange ring 18. This process can also be carried out accordingly at the location proper through which the rod is inserted into the tank after the junction weld 20 between the flange 18 and the tank 19 has already taken place, for example by means of induction heating. Repeated tests have found that junctions produced in accordance with the foregoing method of my invention, are vacuum-tight and also its strength is so great for planar geometrical surfaces that the metallo-ceramic junction cannot be loosened or broken up by grinding with a parting tool or wheel without special chucking or tensioning devices.

I claim:

1. Method of joining metal and ceramic members which comprises heating a metal support in engagement with a ceramic member by induction currents from an induction coil so that a portion of the ceramic member adjacent the metal support is in turn heated by heat transfer from the metal support to a temperature at which metal is precipitated on the ceramic member portion from an atmosphere of a vaporous compound of the metal pyrolytically decomposable at that temperature, displacing the metal-coated ceramic member and induction coil relative to one another so as to generate eddy currents in the metal coating for further heating succeeding portions of the ceramic member in the direction of relative displacement and spreading the metal coating on the succeeding portions and thereafter bringing the metal coating in engagement with a metal member and applying heat and pressure between the ceramic and metal members in a diffusion welding process so as to thereby join the members.

References Cited

UNITED STATES PATENTS

| | | | |
|---|---|---|---|
| 2,859,132 | 11/1958 | Novak et al. | 117—107.2 |
| 2,986,808 | 6/1961 | Schnedler | 117—93.2 X |
| 3,288,829 | 11/1966 | Wilkinson | 117—107.2 X |
| 3,296,692 | 1/1967 | Griffin | 29—472.9 |
| 3,307,009 | 2/1967 | Schroeder | 219—10.79 X |

JOSEPH V. TRUHE, Primary Eaminer

B. A. STEIN, Assistant Examiner

U.S. Cl. X.R.

29—472.9, 473.1; 65—59; 117—107.2